United States Patent
In De Betou et al.

(10) Patent No.: US 9,391,693 B2
(45) Date of Patent: Jul. 12, 2016

(54) PROTECTION FOR DISTRIBUTED RADIO ACCESS NETWORKS

(75) Inventors: Einar In De Betou, Vallingby (SE); Jacob Österling, Jarfalla (SE); Niklas Johansson, Sollentuna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 414 days.

(21) Appl. No.: 14/117,021

(22) PCT Filed: Aug. 24, 2011

(86) PCT No.: PCT/EP2011/004250
§ 371 (c)(1),
(2), (4) Date: Feb. 25, 2014

(87) PCT Pub. No.: WO2012/155936
PCT Pub. Date: Nov. 22, 2012

(65) Prior Publication Data
US 2014/0161438 A1   Jun. 12, 2014

(30) Foreign Application Priority Data

May 17, 2011   (SE) .................. PCT/SE2011/050621

(51) Int. Cl.
*H04B 10/00* (2013.01)
*H04B 10/032* (2013.01)
(Continued)

(52) U.S. Cl.
CPC ........ *H04B 10/032* (2013.01); *H04B 10/25753* (2013.01); *H04J 14/0287* (2013.01); *H04W 24/04* (2013.01); *H04W 88/085* (2013.01)

(58) Field of Classification Search
CPC ............. H04B 10/032; H04B 10/2575; H04B 10/25752; H04B 10/25753; H04B 10/25758
See application file for complete search history.

(56) References Cited

U.S. PATENT DOCUMENTS

| 6,351,582 B1 | 2/2002 | Dyke et al. |
| 7,940,667 B1 | 5/2011 | Coady et al. |

(Continued)

FOREIGN PATENT DOCUMENTS

| JP | 2006020224 | 1/2006 |
| WO | WO-03/067795 | 8/2003 |

(Continued)

OTHER PUBLICATIONS

PCT International Search Report for PCT Counterpart Application No. PCT/SE2011/050621, (Feb. 10, 2012), 4 pages.

(Continued)

*Primary Examiner* — Daniel Dobson
(74) *Attorney, Agent, or Firm* — NDWE LLP

(57) ABSTRACT

The invention relates to a distributed radio access network communicatively coupled to a core network, and a method for upholding a service in case of a failure in the distributed radio access network. The distributed radio access network comprises a main radio equipment controller communicatively coupled to at least one remote radio unit over a main optical path, a backup radio equipment controller communicatively coupled to the main radio equipment controller for synchronization, and a protection optical path for communicatively coupling the at least one remote radio unit to the backup radio equipment controller in case of a failure in communication between the main radio equipment controller and the at least one remote radio unit over the main optical path such that a service remains running when the failure occurs.

17 Claims, 3 Drawing Sheets

(51) Int. Cl.
  *H04W 24/04*   (2009.01)
  *H04B 10/2575* (2013.01)
  *H04J 14/02*   (2006.01)
  *H04J 14/00*   (2006.01)
  *H04W 88/08*   (2009.01)

(56) References Cited

U.S. PATENT DOCUMENTS

2007/0264009 A1* 11/2007 Sabat, Jr. ........... H04B 10/1127
                                                       398/5
2009/0245228 A1* 10/2009 Osterling .............. H04J 3/0638
                                                      370/350
2010/0316380 A1   12/2010 de Lind van Wijngaarden

FOREIGN PATENT DOCUMENTS

WO  WO-2007/143169   12/2007
WO  WO-2009/116904    9/2009

OTHER PUBLICATIONS

PCT International Search Report for PCT Counterpart Application No. PCT/EP2011/004250, (Feb. 24, 2012), 4 pages.
PCT Written Opinion of the International Searching Authority for PCT Counterpart Application No. PCT/EP2011/004250, (Feb. 24, 2012), 9 pages.
PCT International Preliminary Report on Patentability for PCT Counterpart Application No. PCT/EP2011/004250, (Aug. 20, 2013), 11 pages.
"Common Public Radio Interface (CPRI); Interface Specification," http://www.cpri.info/downloads/CPRI, CPRI Specification V4.2, (Sep. 29, 2010), 116 pages.
Erkan, et al., "Native Ethernet-Based Self-Healing WDM-PON Local Access Ring Architecture: A New Direction for Supporting Simple and Efficident Resilience Capabilities," IEEE ICC 2010 Proceedings, (May 23, 2010), 6 pages.

* cited by examiner

PROTECTION FOR DISTRIBUTED RADIO ACCESS NETWORKS

CROSS-REFERENCE TO RELATED APPLICATIONS

This applications is a National stage of International Application No. PCT/EP2011/004250, filed Aug. 24, 2011, which claims priority to International Application No. PCT/SE2011/050621, filed May 17, 2011, which are hereby incorporated by reference.

TECHNICAL FIELD

The invention relates to a distributed radio access network, arranged for connecting to a core network.

BACKGROUND

A fiber-based mobile backhaul network will in the following also be referred to as mobile backhaul network. In a mobile backhaul network, the radio access nodes in a radio access network, RAN for short, are connected with nodes in a core network. The RAN is usually a distributed radio access network where the radio nodes, radio equipment controllers, REC for short, and remote radio units, RRU for short, are split apart and communicate over a fiber optic network. The fiber optic network connects the REC with the RRUs and is referred to as mobile backhaul network in the following.

Typically, the radio nodes are interconnected via the mobile backhaul network that comprises a point-to-point fiber topology, a point-to-multipoint fiber topology or a ring fiber topology. Currently, fiber optic networks have short fiber path distances. In future scenarios it should be possible to transmit over several hundreds of kilometres of fiber path and to provide services over the RAN even in case of a failure in the fiber optic network. Until now, there is no effective way of protecting the core network or central parts of a distributed RAN. Also there is the need for more robust RANs since current RANs do not necessarily show robustness while being flexible and simple.

SUMMARY

It is the object of the invention to provide a mechanism for protecting a distributed RAN from failure in a flexible and cost-effective way in connection with providing the largest possible robustness.

This object is achieved by the subject matter of the independent claims.

Preferred embodiments are defined in the sub claims.

According to a first aspect of the invention, this object is achieved by a distributed radio access network, arranged for connecting to a core network, comprising a main radio equipment controller connected to at least one remote radio unit over a main optical path, a backup radio equipment controller connected for synchronization to the main radio equipment controller, and a protection optical path for connecting the at least one remote radio unit to the backup radio equipment controller in case of a failure in communication between the main radio equipment controller and the at least one remote radio unit over the main optical path such that a service remains running when the failure occurs.

The backup radio equipment controller can be a usual radio equipment controller that serves as a backup and thus there is no need to introduce a new radio equipment controller into the distributed RAN. Therefore, a pre-existing radio equipment controller can be used as a backup radio equipment controller, i.e. as a radio equipment controller with an added function configured to serve as backup to neighbouring radio equipment controllers. However, it is also possible that a dedicated backup radio equipment controller is provided. It is an idea of the invention to keep the costs of protection in the fiber optic network as low as possible. The protection of parts of the fiber optic network is done with a backup network.

The backup radio equipment controller is synchronized with the main radio equipment controller which means that the backup radio equipment controller is updated with relevant state information of the main radio equipment controller. The term "synchronization" comprises the exchange of state information and/or the exchange of any other information or data.

According to a preferred embodiment of the invention, at least one of the main radio equipment controller and the at least one remote radio unit is configured to signal link failure to the backup radio equipment controller upon detection of the failure in communication between the main radio equipment controller and the at least one remote radio unit via the main optical path. In this way, the backup radio equipment controller becomes aware about a link failure in the distributed RAN and can start initiating a communication and thus avoid a failure of a service.

Further, according to a preferred embodiment of the invention, the main radio equipment controller and the at least one remote radio unit are configured to enter into negotiation upon detection of the failure in communication between the main radio equipment controller and the at least one remote radio unit via the main optical path, each of the main radio equipment controller and the at least one remote radio unit being arranged in a first service area, the backup radio equipment controller arranged in a second service area and being configured to listen in to the negotiation and to respond to a negotiation message from the at least one remote radio unit via the protection optical path such that at least part of the negotiation is switched from the first service area to the second service area. The main radio equipment controller thus holds a status information about which links are working between the main radio equipment controller and the at least one remote radio unit. Hence, the main radio equipment controller can detect a failure in communication with the at least one remote radio unit. The responsibility for communicating with the at least one remote radio unit can then be transferred over to the backup radio equipment controller. The main radio equipment controller can continuously provide status information to the backup radio equipment controller in such a way that the backup radio equipment controller immediately starts negotiating with the at least one remote radio unit whenever the main link fails, i.e. whenever there is a failure in communication over the main optical path. The main radio equipment controller can also immediately send over a command to the backup radio equipment controller to take over responsibility for communicating with the at least one remote radio unit.

Moreover, according to a preferred embodiment of the invention, the protection optical path is longer than the main optical path and comprises a transmission capacity which is smaller than the transmission capacity over the main optical path such that in case of the failure in communication over the main optical path the backup radio equipment controller is configured to negotiate with the at least one remote radio unit a reduction in at least one out of a plurality of predefined parameters, such as total bandwidth of the transmitted data or transmission rate or predetermined number of antennas arranged in the at least one remote radio unit. A reduction in at least one out of a plurality of predefined parameters changes the total RF bandwidth in the air interface between the remote radio units and the user equipment, such as mobile terminals, or the number of antennas arranged in the at least one remote radio unit such that the required transmission capacity of the backhaul network is reduced. This allows long paths to be used as backup and hence allows any existing radio equipment controller to become a backup radio equipment controller. Moreover, the backup radio equipment controller can be closely positioned to the main radio equipment controller and thus a reduction in total bandwidth would not show a significant impact in the distributed RAN. Further, not all antennas provided must be used, i.e. not all antennas always need to be operational. After detecting a failure, the radio nodes fall back to a lower common bit rate configured for communicating over the mobile backhaul network. This lower common bit rate is low enough to work in any conditions. The backup radio equipment controller and the at least one remote radio unit start negotiating about a higher bit rate for communicating over the mobile backhaul network. The changes are implemented in the distributed radio access network, wherein the changes comprise a reduction of total RF bandwidth, a reduction in the predetermined number of antennas and/or a reduction in receiver algorithm complexity.

Preferably, the predetermined number of antennas being arranged in the at least one remote radio unit is changed such that the quality of service level and/or the service level agreement remain(s) above a predefined value, wherein quality of service level and/or service level agreement correspond to the quality level which runs over the distributed radio access network. The total bandwidth of the transmitted data preferably comprises a range ≥1.6 MHz and ≤100 MHz, more preferably a range ≥5 MHz and ≤40 MHz. In this way, all requirements of the distributed RAN can be met. The predetermined number of antennas preferably corresponds to a value between 1 and 16, more preferably to a value between 2 and 8. Therefore, it becomes possible to adjust to the changing requirements in the distributed RAN. Furthermore, the distributed radio access network preferably comprises a plurality of remote nodes configured for connecting the main radio equipment controller with the at least one remote radio unit, wherein each remote node out of the plurality of remote nodes is configured for bundling a plurality of fibers, and wherein the fibers are collected in a main cable. The fibers from the distributed remote radio units are preferably aggregated, in one or in several stages, in so-called remote nodes. After aggregation, the multiple fibers are preferably collected in a main cable that connects to the main radio equipment controller. Preferably, the distributed radio access network comprises a combiner configured for multiplexing a plurality of signals from the plurality of fibers into a predefined fiber such that a communication between the main radio equipment controller and the at least one remote radio unit and/or between the backup radio equipment controller and the at least one remote radio unit takes place. The combiner preferably comprises at least one of a power splitter and a wavelength division multiplexing component, WDM component for short, such as a fiber coupler. The plurality of remote nodes are at least partly interconnected to one another such that a plurality of remote radio units is at least partly interconnected to one another over at least a part of the plurality of remote nodes.

According to a preferred embodiment of the invention, the backup radio equipment controller is configured to negotiate with the at least one remote radio unit the turning off of at least one extension carrier out of a plurality of extension carriers which is configured for carrying data traffic such that transmission rate decreases as a function of reduced total bandwidth, more preferably as a function of reduced total RF bandwidth, of the transmitted data. The required backhaul transmission rate decreases as a function of reduced total RF bandwidth in the air interface between the remote radio units and the user equipment, such as mobile terminals. Preferably, the backup radio equipment controller is configured to negotiate with the at least one remote radio unit the turning off of at least one anchor carrier out of a plurality of anchor carriers which provides access to higher control entities and supports mobility control in the distributed radio access network. The backup radio equipment controller is preferably configured to negotiate with the at least one remote radio unit the decrease of the carrier bandwidth of a final remaining carrier. The backup radio equipment controller is preferably configured to send a command to the at least one remote radio unit to reduce the number of antennas arranged in the at least one remote radio unit.

According to a preferred embodiment of the invention, the at least one remote radio unit comprises a signal path receiver arranged for receiving and activating a provided signal path configuration, the signal path configuration providing a combination of at least one of a set of available signal paths to be mapped onto the predetermined number of antennas such that the predetermined number of antennas is reduced. In this way, the distributed RAN is kept as simple and efficient as possible.

According to a preferred embodiment of the invention, a communication between the backup radio equipment controller and the at least one remote radio unit is performed by using a protocol, such as the common public radio interface protocol, and/or by transferring data in time domain and/or in frequency domain and/or a communication between the main radio equipment controller and the at least one remote radio unit is performed by using a protocol, such as the common public radio interface protocol, and/or by transferring data in time domain and/or in frequency domain.

According to a preferred embodiment of the invention, the backup radio equipment controller comprises a switching unit configured for prioritizing traffic and selectively discarding traffic that exceeds a predefined transmission capacity level over the protection optical path. The backup radio equipment controller is preferably connected for synchronization to the main radio equipment controller via a dedicated link. According to other preferred embodiments of the invention, the backup radio equipment controller is connected for synchronization to the main radio equipment controller via the core network.

It is an idea of the invention to protect the central parts of a network by applying a procedure which has been explained above in connection with the first aspect of the invention. In this scenario, a communication over the main optical path between an end user and a main radio equipment controller is redirected to a communication over a protection optical path that leads to a backup radio equipment controller in an adjacent service area. The backup network thus protects from a possible failure that could occur above a splitting point, which is arranged between the main optical path and the protection optical path, wherein a failure can be a fiber cut in the main optical path, a fire in the area of the main radio equipment controller, etc. When the protection mechanism kicks in, the number of antennas per cell is changed, for instance reduced from 8 to 2. The remaining antennas are typically responsible for covering the radio cell with a predetermined performance in the air interface. A radio equipment controller usually shows the ability to prioritize traffic and selectively discard traffic that exceeds a predefined capacity level. For user data, prioritization usually ensures that a service level agreement, SLA for short, and quality-of-service, QoS for short, guarantees are met. It is an idea of the invention to reduce the complexity in the air interface uplink processing. This supports the longer transmission distance over the protection optical path in the fiber optic network. For instance, in a long time evolution system, an LTE system for short, there is a 4 ms roundtrip timing budget between an user equipment, such as a mobile phone, and the radio equipment controller. In this timing budget, more time is dedicated to transmission. Therefore, the remaining budget for processing may have to be reduced with a certain reduction in performance over the air interface. There is a predetermined tradeoff between reduction in performance over air interface and lowering the costs of the protection mechanism as compared to a protection solution where a full capacity of the main link is used.

According to other preferred embodiments of the invention, the fiber optic network protection mechanism is performed as will be explained in the following: Firstly, the main link is setup using a negotiation protocol between the remote radio unit and the main radio equipment controller. The negotiation ensures that the transmission rate over the main link is as high as possible, given the capability of the optical interfaces of the radio nodes and the link characteristics. Secondly, the main link is up and running. The backup radio equipment controller is in a standby mode. The backup radio equipment controller synchronizes state information with the main radio equipment controller such that the backup radio equipment controller comprises relevant data if it has to take over operation from the main radio equipment controller. Thirdly, once a link failure occurs in a protected part of the main link, this is detected in the radio nodes via an alarm. As a consequence, the optical interfaces of the radio nodes in the remote radio unit and the main radio equipment controller enter negotiation. Finally, the backup radio equipment controller receives the negotiation messages from the remote radio unit. It becomes possible for the backup radio equipment controller to follow the negotiation process by decoding the negotiation messages from the remote radio unit. Upon a failure, it is possible for the backup radio equipment controller to reply to the negotiation messages from the remote radio unit. In case of the failure, it is ensured that the backup radio equipment controller steps into action when it is supposed to. This can be performed in three different ways which will be explained in the following.

A first option is that the radio nodes declare the reason, for instance a link setup or a loss of signal, for why the backup radio equipment controller enters negotiation in the negotiation protocol. In this way, it becomes possible for the backup radio equipment controller to distinguish a failure from a normal link setup. In case of a failure, the backup radio equipment controller responds to the remote radio unit negotiation. A second option is that the main radio equipment controller informs the backup radio equipment controller of when a failure has occurred. Therefore, the backup radio equipment controller knows if it should respond to the remote radio unit negotiation. A final option is that the backup radio equipment controller waits for a predetermined time for the main radio equipment controller to reply to the negotiation from the remote radio unit. If this does not happen, the backup radio equipment controller assumes that a failure has occurred, replies to the remote radio unit via negotiation and establishes communication with a radio remote unit over the protection link. Since the backup radio equipment controller can follow the upstream transmission from the remote radio unit, one option for the backup radio equipment controller to find out if the main radio equipment controller has replied to the remote radio unit is looking for when the remote radio unit acknowledges that it has received the "info message" from the main radio equipment controller. Alternatively, the remote radio unit explicitly announces that it has contact with the main radio equipment controller by transmitting a specific message in the upstream.

According to a second aspect of the invention, above mentioned object is achieved by a backup radio equipment controller, arranged in a second service area to form part of a distributed radio access network, the backup radio equipment controller being configured to communicate synchronization data with a main radio equipment controller arranged in a first service area and connected to a remote radio unit that is in communication with the main radio equipment controller and also arranged in the first service area, and the backup radio equipment controller being further configured to enter into communication with the remote radio unit over a protection optical path in case of a failure in communication between the main radio equipment controller and the remote radio unit such that a service remains running when the failure occurs. In this way, a flexible and cost-effective mechanism for protecting a distributed RAN from failure is provided. A pre-existing REC can be used as backup and thus there is no need to provide additional REC and thus the complexity of the distributed RAN is decreased. Further, providing a backup REC serves also to achieve a large robustness in the distributed RAN. It is possible to use a pre-existing REC as backup which is located close to a main REC and thus the requirements in bandwidth reduction can be easily met.

According to a preferred embodiment of the invention, the backup radio equipment controller is further configured to receive a failure message indicating that the failure has occurred in communication of at least one of the main radio equipment controller and the remote radio unit. The failure message preferably comprises at least one of a link failure alarm, such as a loss of signal alarm, a loss of synchronization alarm, a low signal level alarm or a high bit error ratio alarm, a state information of an user equipment, the transmission rate and a command to change the number of antennas, to reduce the total transmission bandwidth and/or to resume operation.

According to a preferred embodiment of the invention, upon receipt of the failure message the backup radio equipment controller is configured to negotiate with the remote radio unit a reduction in at least one out of a plurality of predefined parameters, such as total bandwidth of the transmitted data or transmission rate or predetermined number of antennas which are arranged in the remote radio unit. A reduction in at least one out of a plurality of predefined parameters changes the total RF bandwidth in the air interface between the remote radio units and the user equipment, such as mobile terminals, or the number of antennas arranged in the at least one remote radio unit such that the required transmission capacity of the backhaul network is reduced. Hence, costs can be drastically reduced.

According to a third aspect of the invention, the above mentioned object is achieved by a method for upholding a service in case of a failure in a distributed radio access network, wherein a main radio equipment controller is connected to at least one remote radio unit over a main optical path, and wherein the main radio equipment controller is synchronized with a backup radio equipment controller, comprising the steps of detecting the failure in communication between the main radio equipment controller and the at least one remote radio unit over the main optical path; and switching from the main optical path to a protection optical path in case of the failure such that the at least one remote radio unit is connected to the backup radio equipment controller.

According to a fourth aspect of the invention, above mentioned object is achieved by a method for upholding a service in case of a failure via a backup radio equipment controller, arranged in a second service area to form part of a distributed radio access network, comprising the steps of communicating synchronization data with a main radio equipment controller arranged in a first service area and connected to a remote radio unit that is in communication with the main radio equipment controller and also arranged in the first service area, and entering into communication with the remote radio unit over a protection optical path in case of a failure in communication between the main radio equipment controller and the remote radio unit.

According to a fifth aspect of the invention, above mentioned object is achieved by a computer program product comprising code means configured to perform the steps of at least one of the methods according to the third and the fourth aspect of the invention when run on a computer device.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION

The distributed radio access network according to the invention uses a specific procedure. According to a first preferred embodiment of the invention, there is a connection between a main radio equipment controller 2 and a backup radio equipment controller 3 such that a backup node has access to necessary information once the transmission is switched from a main optical path 6 to a protection optical path 7. According to other preferred embodiments of the invention, this connection is not a direct connection but goes via the core network.

Figure 1:
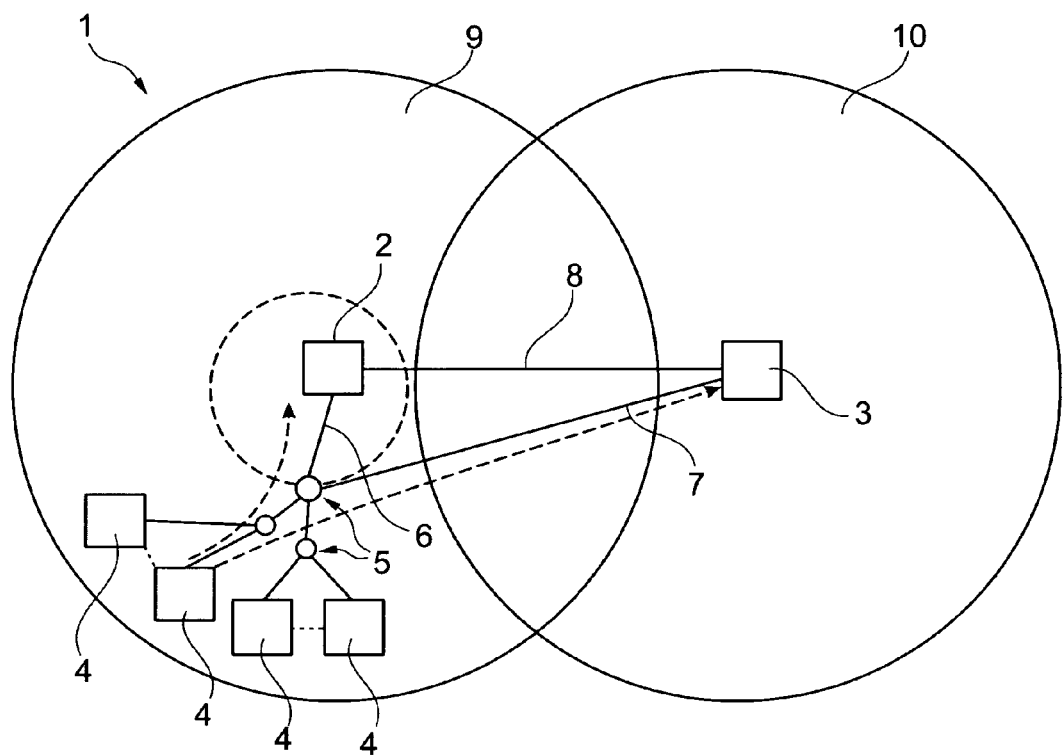
FIG. 1 illustrates a distributed radio access network which is protected via a procedure according to a first preferred embodiment of the invention.

FIG. 1 shows a distributed radio access network 1 where the central part of the network is protected by a backup network. The distributed radio access network 1 is configured for connecting to a core network. The main radio equipment controller 2 in a first service area 9 is connected via a remote node out of a plurality of remote nodes 5 to four remote radio units 4 over the main optical path 6. The backup radio equipment controller 3 synchronizes with the main radio equipment controller 2 over a synchronization link 8. In case of a failure in the distributed radio access network 1, communication is switched to the protection optical path 7 and the remote or radio node 5 is connected to the backup radio equipment controller 3 such that the remote radio units 4 communicate with the backup radio equipment controller 3 in an adjacent or second service area 10 and a service remains running when the failure occurs.

In case of a point-to-point fiber topology, the multiple fibers from the remote radio units towards the central part of the network are aggregated into a cable which carries many fibers in the remote nodes. This takes place in one stage. According to other preferred embodiments of the invention, this takes place in several stages. In a point-to-multipoint fiber topology, apart from aggregating multiple fibers into a fiber cable, the plurality of signals from the plurality of fibers are multiplexed into a predefined fiber. This is usually done via a passive optical component, such as a power splitter, or via a wavelength division multiplexing component, such as a fiber coupler.

In cases of failure in the network of the main optical path 6, a service remains running by switching over to the protection optical path 7. Usually, the protection optical path 7 spans a longer distance than the main optical path 6. According to the first preferred embodiment of the invention, also a link 8 is shown, wherein the link 8 is configured for synchronization and/or for the exchange of predefined parameters between main radio equipment controller 2 and backup radio equipment controller 3.

It is worth noting that in order to provide a protection optical path 7 that supports the full capacity of the main optical path 6 this usually results in higher costs. This is due to the length of the protection optical path 7 which does not allow the use of low cost optics. However, by choosing a backup REC which is located close to the main REC these costs will remain manageable. Further, it is an idea of the invention to lower the transmission rate over the protection optical path 7 in order to reduce the costs of the protection optical path 7.

The radio or remote nodes reduce the total bandwidth of the transmitted data over the fiber optic network in case of a failure in the protected part of the network. Typically, the radio node adjusts to a lower transmission rate over the protection link upon a failure in the protected part of the fiber optic network. According to the first preferred embodiment of the invention, when the failure occurs the total RF bandwidth in the air interface is reduced and/or the number of antennas is reduced so that the transmitted data is reduced over the protection optical path 7 and the service quality level remains above a predefined value in the distributed radio access network. Preferably, the plurality of remote nodes is configured in such a way that the impact on the quality of services that run over the distributed radio access network is minimized.

A failure in the distributed radio access network could either be a partial failure or a complete failure. If there is a partial failure, a communication over the main link in the fiber optic network takes place but under stricter requirements, such as by lowering the transmission rate. In case of a complete failure, such as a fiber cut or a fire in the first service area 9 around the main radio equipment controller 2, the radio nodes need to communicate over the protection optical path 7 instead of the main optical path 6. In both cases, after a failure the radio nodes communicate at a reduced transmission rate.

Upon protection, the radio nodes are configured for transmitting at a reduced transmission rate over the air interface and the fiber optic network. The switching unit in the main radio equipment controller 2 and in the backup radio equipment controller 3 is configured for prioritizing traffic and selectively discarding traffic that exceeds a predefined transmission capacity level over a predefined path. Hence, the switching unit in the radio nodes and in the media access control layer that schedules transmission over the radio air interface are configured for traffic control as determined by transmission capacity over the protection link.

It can become important to reduce the complexity in the air interface uplink processing in the backup radio equipment controller 3. Therefore, a predefined trade-off between lowered costs of the protection mechanism and decrease of performance in the air interface is easily achievable.

Figure 2:
FIG. 2 schematically illustrates the steps of two different methods for upholding a service in case of a failure according to a second preferred embodiment of the invention.

FIG. 2 shows schematically a method for upholding a service in case of a failure in a distributed radio access network according to a second preferred embodiment of the invention. FIG. 2 schematically illustrates the required steps of two different methods. Before performing the steps of the first method, a main radio equipment controller 2 must be connected to a remote radio unit 4 over a main optical path 6. Further, synchronization between a backup radio equipment controller 3 and the main radio equipment controller 2 is required. Now the steps of the first method are carried out: Firstly, the failure in communication between the main radio equipment controller 2 and the at least one remote radio unit 4 over the main optical path 6 is detected (see step of detecting 11 in the left part of FIG. 2), and, secondly, it is switched from the main optical path 6 to a protection optical path 7 in case of the failure such that the at least one remote radio unit 4 is connected to the backup radio equipment controller 3 (see step of switching 12 in the left part of FIG. 2). In this way, the remote radio unit 4 is connected to the backup radio equipment controller 3 and a service is upheld when a failure in a distributed radio access network 1 occurs.

FIG. 2 further schematically shows the steps of a second method for upholding a service in case of a failure via a backup radio equipment controller according to the second preferred embodiment of the invention. The backup radio equipment controller 3 is arranged in a second service area 10 to form part of a distributed radio access network 1. Firstly, synchronization data is communicated with a main radio equipment controller 2 arranged in a first service area 9 and connected to a remote radio unit 4 that is in communication with the main radio equipment controller 2 and also arranged in the first service area 9 (see step of communicating 13 in the right part of FIG. 2). Secondly, it is entered into communication with the remote radio unit 4 over a protection optical path 7 in case of a failure in communication between the main radio equipment controller 2 and the remote radio unit 4 (see step of entering 14 in the right part of FIG. 2).

Figure 3:
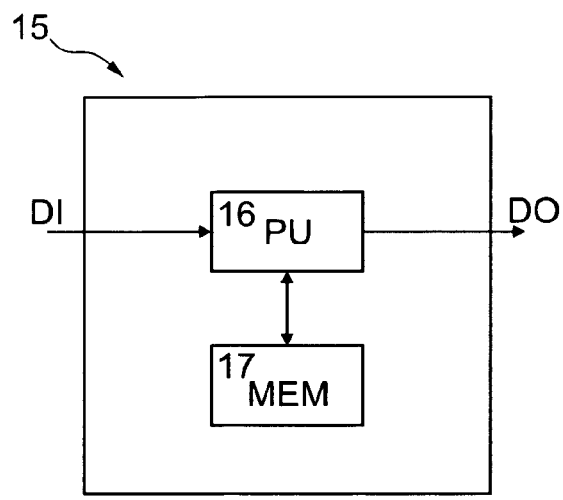
FIG. 3 shows a block diagram of a software-based implementation according to a third preferred embodiment of the invention.

FIG. 3 shows a schematic block diagram of a software-based implementation of a third preferred embodiment of the invention. Here, the proposed device 15 comprises a processing unit (PU) 16, which may be provided on a single chip or a chip module and which may be any processor or computer device with a control unit which performs control based on software routines of a control program stored in a memory (MEM) 17. Program code instructions are fetched from the MEM 17 and are loaded to the control unit of the PU 16 in order to perform the processing steps of the above functionalities described in connection with FIG. 2. The processing steps of the blocks 11 and 12 or 13 and 14, respectively, may be performed on the basis of input data DI and may generate output data DO, wherein the input data DI may correspond to data or signals that have been communicated and/or sensed and the output data DO may correspond to data or signals that are going to be communicated to other devices.

Figure 4:
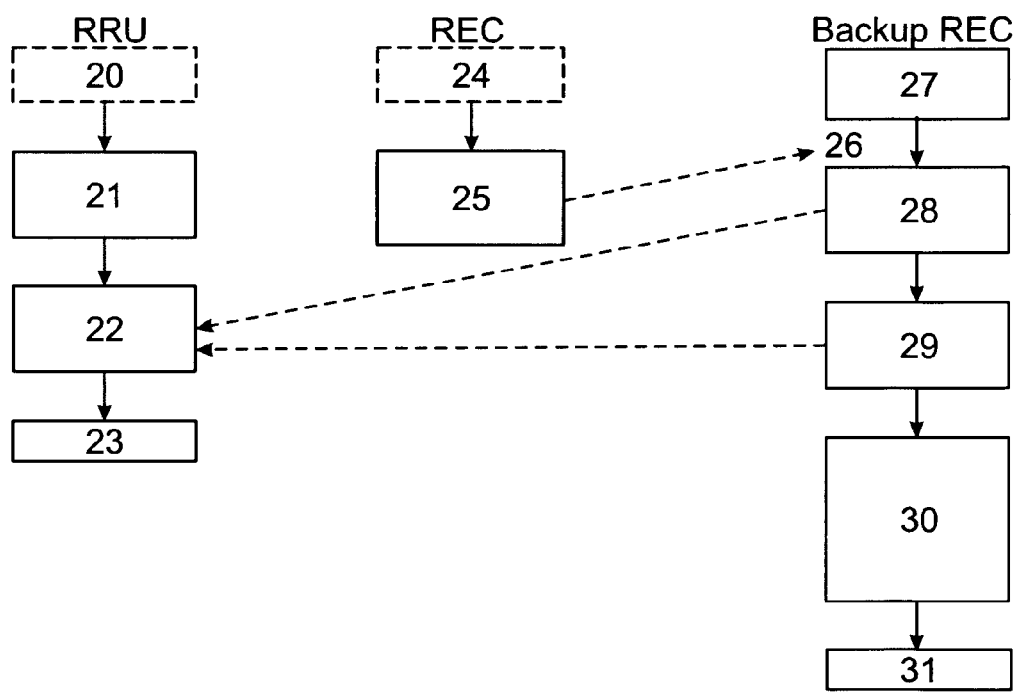
FIG. 4 illustrates a state diagram schematically showing the protection mechanism at the remote radio unit, the main and the backup radio equipment controller according to a fourth preferred embodiment of the invention.

FIG. 4 shows a state diagram showing the protection mechanism at the remote radio unit 4, the main radio equipment controller 2 and the backup radio equipment controller 3 according to a fourth preferred embodiment of the invention. It is shown what steps take place in the radio nodes upon protection. According to this fourth preferred embodiment, the radio nodes communicate using the CPRI protocol. This protocol is used for connecting radio nodes in a distributed radio access network. According to other preferred embodiments of the invention, other protocols or other processes are used. FIG. 4 illustrates in its left part the steps performed in the remote radio unit 4. An optical physical layer detects a link failure (step 20). Then, the optical physical layer adjusts the transmission rate to suit protection optical path requirements (step 21). Afterwards, it is waited for a command from the backup radio equipment controller 3 to either reduce the number of antennas and/or to reduce the bandwidth (step 22). Finally, the operation is resumed (step 23). In step 22, it is waited for the signals received from the backup radio equipment controller 3 to reduce either the number of antennas (step 28) or to reduce the bandwidth (step 29). In the middle part of FIG. 4 the steps performed in the main radio equipment controller 2 are shown. Firstly, the optical physical layer detects a link failure (step 24). Afterwards, a handover operation to the backup radio equipment controller 3 is communicated by sending a wake up command via a dedicated link between the main radio equipment controller 2 and the backup radio equipment controller 3 (step 25 in middle part of FIG. 4). The steps in the backup radio equipment controller 3 are illustrated in the right part of FIG. 4. Firstly, it is in its wait state (step 27), in which it synchronizes the state information with the main radio equipment controller 2. Thus, it waits for the wake up command from the main radio equipment controller (step 26). Then, the remote radio unit is informed to reduce the number of antennas, for instance from 8 to 2 (step 28). Afterwards, the remote radio unit is informed to reduce the bandwidth, for instance from 20 MHz to 5 MHz (step 29). Afterwards, the scheduled bandwidth for user data is reduced. It must be noted that the reduction in channeled bandwidth is proportional to the rate reduction when switching to the protection optical path 7 (step 30 in FIG. 4). Finally, a resume operation command is sent (step 31).

The CPRI interface transfers an air interface signal in the time domain. Therefore, the sample rate and thus the transferred air interface bandwidth directly affect the CPRI bit rate. Long time evolution, LTE for short, shows multiple fixed channel bandwidth ranging from 1.6 MHz up to multiple factors of 20 MHz. This is called carrier aggregation. Universal terrestrial radio access, UTRA for short, shows a fixed channel bandwidth of 5 MHz and supports multiple factors of 5 MHz. This is called multicarrier operation. The reduction of the total bandwidth is performed in two steps: In a first step, extension carriers are turned off, i.e. carriers which are defined to only carry additional data traffic. This is done with a predefined delay and without reconfiguring the cell, i.e. the end user peak data rate decreases linearly with a removed bandwidth. In a second step, the carriers also operating as anchor carriers, i.e. carriers which user equipments are using to access the network higher control entities and on which the user equipment is measuring to aid mobility control are turned off. This usually causes disturbance to the network and a redirection of user equipment connections. For an LTE, a third step is performed: This is done in order to decrease the carrier bandwidth of the final remaining carrier. This usually causes disturbance to the network and a reestablishment of user equipment connections. According to other preferred embodiments of the invention, instead of using the CPRI protocol, a data transfer in time and/or frequency domain is performed.

Figure 5:
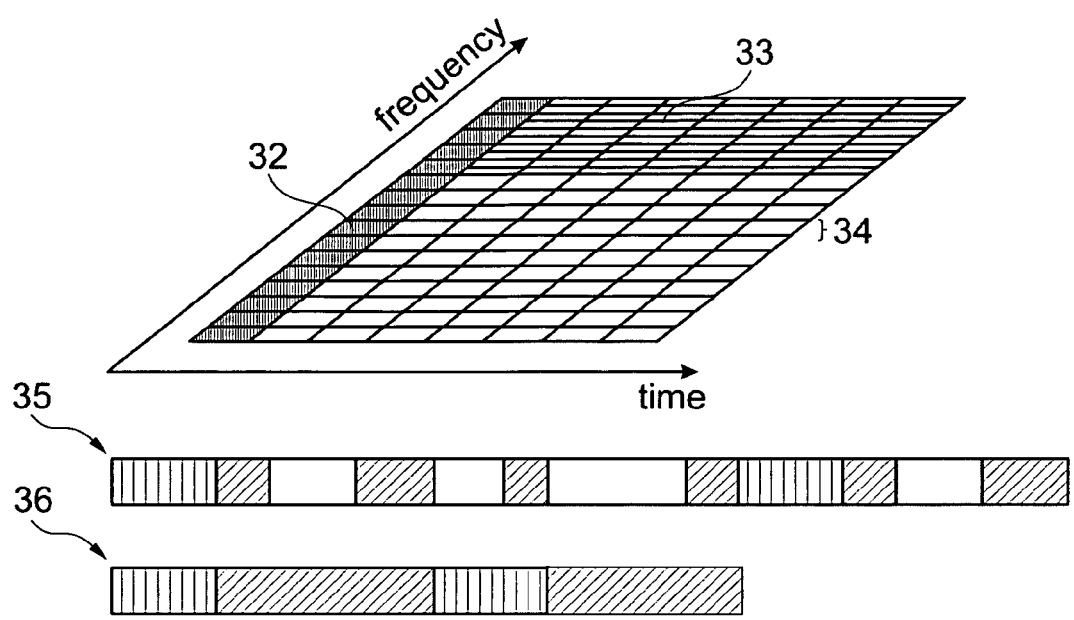
FIG. 5 shows a simplified orthogonal frequency-division multiplexing system scheduled to reduce the transmission rate over a fiber optic network according to a fifth preferred embodiment of the invention.

FIG. 5 shows the air interface in a simplified orthogonal frequency division multiplexing radio system, OFDM radio system for short, wherein the system is scheduled to reduce the transmission rate over the fiber optic network to half the normal rate according to a fifth preferred embodiment of the invention. An OFDM system, such as an LTE, where the bandwidth over the air interface is scheduled in both time and frequency domain is illustrated. Upon protection, the media access control scheduler is made aware of the situation and only schedules a reduced bandwidth over the air interface. In the upper part of FIG. 5, the control channel 32 is broadcast. Further, a plurality of user channels 33 is illustrated. The reduction in scheduled bandwidth is proportional to the reduction in transmission rate that results from switching over to the protection link. The fiber optic physical layer devices in the remote radio units and the radio equipment controllers transmit all resource blocks before protection, and only resource blocks 32 and 33 after protection. FIG. 5 shows that only the filled resource blocks 33 are scheduled, wherein the blank resource blocks 34 are left unused. The lower part of FIG. 5 shows that a frame is transmitted over a fiber optic network between the remote radio units and the main and backup radio equipment controller. The frames before protection 35 at the full transmission rate are shown. The frames when protection is active 36 at a 50% transmission rate are also shown in FIG. 5. Only the filled resource blocks, i.e. 50% of the total number of resource blocks, are transported over the fiber optic network.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A distributed radio access network, arranged for communicatively coupling to a core network, the distributed radio access network comprising:
   a main radio equipment controller communicatively coupled to at least one remote radio unit over a main optical path;
   a backup radio equipment controller communicatively coupled to the main radio equipment controller for synchronization; and
   a protection optical path for communicatively coupling the at least one remote radio unit to the backup radio equipment controller in case of a failure in communication between the main radio equipment controller and the at least one remote radio unit over the main optical path, such that a service remains running when the failure occurs
   wherein the protection optical path is longer than the main optical path and comprises a transmission capacity which is smaller than a transmission capacity over the main optical path such that in case of the failure in communication over the main optical path the backup radio equipment controller is configured to negotiate with the at least one remote radio unit a reduction in at least one out of a plurality of predefined parameters.

2. The distributed radio access network according to claim 1, wherein at least one of the main radio equipment controller and the at least one remote radio unit is configured to signal link failure to the backup radio equipment controller upon detection of the failure in communication between the main radio equipment controller and the at least one remote radio unit via the main optical path.

3. The distributed radio access network according to claim 2, wherein the main radio equipment controller and the at least one remote radio unit are configured to enter into negotiation upon detection of the failure in communication between the main radio equipment controller and the at least one remote radio unit via the main optical path, each of the main radio equipment controller and the at least one remote radio unit arranged in a first service area, the backup radio equipment controller arranged in a second service area and configured to listen in to the negotiation and to respond to a negotiation message from the at least one remote radio unit via the protection optical path such that at least part of the negotiation is switched from the first service area to the second service area.

4. The distributed radio access network according to claim 3, wherein said plurality of predefined parameters includes total bandwidth of transmitted data, transmission rate, and predetermined number of antennas arranged in the at least one remote radio unit.

5. The distributed radio access network according to claim 4, wherein the backup radio equipment controller is configured to negotiate with the at least one remote radio unit a turning off of at least one extension carrier out of a plurality of extension carriers which is configured for carrying data traffic such that transmission rate decreases as a function of reduced total bandwidth of the transmitted data.

6. The distributed radio access network according to claim 5, wherein the backup radio equipment controller is configured to negotiate with the at least one remote radio unit a turning off of at least one anchor carrier out of a plurality of anchor carriers which provides access to higher control entities and supports mobility control in the distributed radio access network.

7. The distributed radio access network according to claim 6, wherein the backup radio equipment controller is configured to negotiate with the at least one remote radio unit a decrease of a carrier bandwidth of a final remaining carrier.

8. The distributed radio access network according to claim 7, wherein the backup radio equipment controller is configured to send a command to the at least one remote radio unit to reduce a number of antennas arranged in the at least one remote radio unit.

9. The distributed radio access network according to claim 8, wherein the at least one remote radio unit comprises a signal path receiver configured to receive and activate a provided signal path configuration, the provided signal path configuration providing a combination of at least one of a set of available signal paths to be mapped onto the predetermined number of antennas such that the predetermined number of antennas is reduced.

10. The distributed radio access network according to claim 9, wherein a communication between the backup radio equipment controller and the at least one remote radio unit is performed by using a common public radio interface protocol, or by transferring data in time domain or in frequency domain, and wherein a communication between the main radio equipment controller and the at least one remote radio unit is performed by using the common public radio interface protocol, or by transferring data in time domain or in frequency domain.

11. The distributed radio access network according claim 10, wherein the backup radio equipment controller comprises a switching unit configured to prioritize traffic and selectively discard traffic that exceeds a predefined transmission capacity level over the protection optical path.

12. The distributed radio access network according to claim 11, wherein the backup radio equipment controller is communicatively coupled to the main radio equipment controller via a dedicated link for synchronization.

13. The distributed radio access network according to claim 11, wherein the backup radio equipment controller is communicatively coupled to the main radio equipment controller via the core network for synchronization.

14. A backup radio equipment controller, arranged in a second service area to form part of a distributed radio access network, configured to:
   communicate synchronization data with a main radio equipment controller arranged in a first service area, wherein the main radio equipment controller is communicatively coupled to a remote radio unit that is in communication with the main radio equipment controller, wherein the remote radio unit is also arranged in the first service area;
   receive a failure message indicating that a failure has occurred in communication of at least one of the main radio equipment controller and the remote radio unit; and
   upon receipt of the failure message, negotiate with the remote radio unit a reduction in at least one out of a plurality of predefined parameters, wherein the plurality of predefined parameters include total bandwidth of transmitted data, transmission rate, and predetermined number of antennas arranged in the remote radio unit such that a service remains running when the failure occurs.

15. A method for upholding a service in case of a failure in a distributed radio access network, wherein a main radio equipment controller is communicatively coupled to at least one remote radio unit over a main optical path, and wherein the main radio equipment controller is synchronized with a backup radio equipment controller, the method comprising:
   detecting a failure in communication between the main radio equipment controller and the at least one remote radio unit over the main optical path;
   switching from the main optical path to a protection optical path in response to detecting the failure, wherein the protection optical path is longer than the main optical path and comprises a transmission capacity which is smaller than a transmission capacity over the main optical path, such that the at least one remote radio unit is communicatively coupled to the backup radio equipment controller; and
   negotiating with the at least one remote radio unit a reduction in at least one out of a plurality of predefined parameters.

16. A method for upholding a service in case of a failure in a backup radio equipment controller, arranged in a second service area to form part of a distributed radio access network, the method comprising:
   communicating synchronization data with a main radio equipment controller, wherein the main radio equipment controller is arranged in a first service area and communicatively coupled to a remote radio unit, wherein the remote radio unit is in communication with the main radio equipment controller and also arranged in the first service area;
   entering into communication with the remote radio unit over a protection optical path in response to a failure in communication between the main radio equipment controller and the remote radio unit, wherein the protection optical path is longer than the main optical path and comprises a transmission capacity which is smaller than a transmission capacity over the main optical path; and
   negotiating with the remote radio unit a reduction in at least one out of a plurality of predefined parameters.

17. A non-transitory computer-readable medium having computer instructions stored therein, which when executed by a backup radio equipment controller arranged in a second service area to form part of a distributed radio access network, cause the backup radio equipment controller to perform operations comprising:
   communicating synchronization data with a main radio equipment controller, wherein the main radio equipment controller is arranged in a first service area and communicatively coupled to a remote radio unit, wherein the remote radio unit is in communication with the main radio equipment controller and also arranged in the first service area;
   entering into communication with the remote radio unit over a protection optical path in response to a failure in communication between the main radio equipment controller and the remote radio unit, wherein the protection optical path is longer than the main optical path and comprises a transmission capacity which is smaller than a transmission capacity over the main optical path; and
   negotiating with the remote radio unit a reduction in at least one out of a plurality of predefined parameters.

* * * * *